United States Patent [19]

Chang

[11] Patent Number: 5,625,144
[45] Date of Patent: Apr. 29, 1997

[54] SIMPLE, LOW-COST, LOW-NOISE, AND ENERGY-EFFICIENT DIGITAL TIRE GAUGE

[76] Inventor: Yih-Min Chang, 3rd Fl., No. 40, Yin-Shan Street, Kaohsiung, Taiwan

[21] Appl. No.: 595,413

[22] Filed: Feb. 5, 1996

Related U.S. Application Data

[63] Continuation-in-part of Ser. No. 193,293, Feb. 8, 1994, abandoned.

[51] Int. Cl.$^6$ .............................. B60C 23/02; G01L 9/00
[52] U.S. Cl. .............................................. 73/146.3; 73/723
[58] Field of Search .............................. 73/146.3, 146.4, 73/146.5, 146.8, 723, 724, 727, 754; 364/556, 558

[56] References Cited

U.S. PATENT DOCUMENTS

| | | |
|---|---|---|
| 4,250,759 | 2/1981 | Vago et al. |
| 4,704,901 | 9/1987 | Rocco et al. |
| 4,748,845 | 6/1988 | Rocco et al. |
| 5,394,343 | 2/1995 | Tsao |
| B1 4,250,759 | 12/1989 | Vago et al. |

*Primary Examiner*—Elizabeth L. Dougherty
*Assistant Examiner*—William L. Oen
*Attorney, Agent, or Firm*—Knobbe, Martens, Olson & Bear, LLP

[57] ABSTRACT

A digital tire gauge adapted to be electrically connected to a power supply for measuring a pressure of a fluid in a tire includes, a transducing oscillator mounted in a gauge housing for transducing an imposed pressure of said fluid into a signal of a periodic sequence of cycles, and including a pressure sensor having at least one resistor having a resistance thereof which changes with imposed pressure, a capacitor electrically connected to the pressure sensor for forming therewith an oscillating circuit; and a plurality of inverters electrically connected to the capacitor and pressure sensor to provide a gain for the transducing oscillator, an isolating inverter electrically connected to the transducing oscillator, and functioning as a buffer for impedance matching of the transducing oscillator, a processor electrically connected to the buffer for generating a numerical value in response to a signal from said buffer, a display electrically connected to the processor for displaying a digital reading in accordance with the numerical value and a switch electrically connected respectively at both ends thereof to the processor and the power supply.

24 Claims, 8 Drawing Sheets

SIMPLE, LOW-COST, LOW-NOISE, AND ENERGY-EFFICIENT DIGITAL TIRE GAUGE

FIELD OF THE INVENTION

The present invention is a CIP application of the parent application bearing the U.S. Ser. No. 08/193,293 and filed on Feb. 8, 1994 now abandoned.

The present invention relates generally to a pressure gauge, and more particularly to a pressure gauge with a digital display for measuring a pressure of a fluid.

BACKGROUND OF THE INVENTION

Pressure gauge with digital displays have been utilized for years. Traditional electronic pressure gauges typically include a pressure transducer 20, an amplifier 21, an analog-to-digital (referred as A/D hereinafter) converter 22, a microprocessor (CPU) 23, a driver 24 for driving the display, a light emitting diode (LED) or a liquid crystal display (LCD) 25 for displaying the measured tire pressure, a battery-supplied power control circuit 26 for energizing the electronic circuitry and converting the digital signal into a numerical reading, and a buzzer 28 as shown in FIG. 1, wherein the transducer 20 suffers the stress due to an imposed pressure, the amplifier 21 is connected to the transducer 20 to amplify the analog signal generated from the transducer 20 according to the change of the imposed pressure, A/D converter 22 is connected to the amplifier 21 to convert the analog signal into a digital signal, and the digital display 25 is connected to the A/D converter 22 to display a digital reading in accordance with the digital signal.

Moreover, four electrically interconnected piezoresistors 11, 12, 13 & 14 are utilized in the transducer 20 to form a Wheatstone bridge, as shown in FIG. 2. The resistance of the two piezoresistors 11 and 13 on the Wheatstone bridge increases with the increased pressure applied thereto while that of the other two piezoresistors 12 and 14 decreases, and vice versa. An analog voltage is generated according to the potential difference between the junctions 15 and 16 within the Wheatstone bridge as depicted in FIG. 2, and the analog voltage is amplified by the amplifier 21 and thereafter digitized by the A/D converter 22.

The obtained digital signal in response to the imposed pressure is transmitted into a suitable electronic controller such as the microprocessor circuit CPU 23. The CPU 23 controls the driver 24 to convert the digital signal into the numerical reading displayed on the display 25.

An audible signal device 28 will beep to remind the user when the maximum pressure is detected. Besides, the pressure gauge utilizes at least one battery as a power source which is manipulated by an interconnecting power bus 27 and a power control circuit 26 electrically connected thereto. The power control circuit 26 is in turn operated by the CPU 23.

The prior art of pressure gauges with digital displays includes:

1) U.S. Pat. No. 4,250,759 and B1 4,250,759 both entitled "Digital Readout Gauge" issued to Vago et al., and referred as Ref. 1 and Ref. 2 accordingly hereinafter;
2) U.S. Pat. No. 4,704,901 entitled "Tire Pressure Gauge" issued to Rocco et at., and referred as Ref. 3 hereinafter;
3) U.S. Pat. No. 4,784,845 entitled "Tire Pressure Gauge", which is the Continuation application of U.S. Pat. No. 4,704,901 issued to Rocco et al., and referred as Ref. 4 hereinafter; and
4) U.S. Pat. No. 5,394,343 entitled "Electronic Tire Gauge" issued to Tsao, and referred as Ref. 5 hereinafter.

Ref 1 and Ref. 2 disclose a pressure gauge wherein a pressure transducer is stressed by an imposed pressure and provides an analog voltage which is further amplified by an operational amplifier and then passes to a capacitor wherein the analog voltage with a peak value is held which subsequently passes to an A/D converter to be converted into a digital voltage in the form of binary bits. Then the digital voltage in binary form is passed to a segment decoder to be converted into a decimal form to drive the display numerals of the digital readout display.

Ref. 3 and Ref. 4 disclose a pressure gauge wherein a pressure sensor, such as a piezoresistive transducer, is subjected to an imposed pressure and generates an analog output signal which is further fed through an amplifier and an A/D converter, and the resulting digital signal is directed to a microprocessor circuit (CPU) which controls a driver circuit that in turn drives the visual reading on a numerical display.

Ref. 5 discloses a pressure gauge wherein a periodic (cyclic) signal with a constant low frequency is generated from a voltage-controlled triangular wave oscillator (VCO) circuitry for serving as a reference signal, and the ramp down portion of the VCO waveform is employed for being compared with the analog voltage signal generated from the transducer in response to the imposed pressure. A signal representing the compared result is obtained by a comparator which comprises a micro-processor including programs and a clock defines the signal cycle.

Nevertheless, the electronic pressure gauges with the digital display mentioned above, owing to the great improvements on the reliability and readability of readings, are overwhelmingly superior than those of mechanical measurement system. However, potential shortcomings of those electronic pressure gauges still exist, e.g., 1. significant errors resulting from the analog-to-digital converting process are unavoidable;
2. more electronic elements and components are required to construct a desired circuit; and
3. relatively higher manufactured costs being involved due to more electronic elements and components are needed.
4. owing to the increased complexity, more bugs are probably encountered during the hardware circuit layout and implementation as well as software programming.

This invention proposes a new pressure gauge with a digital display. The major differences of this invention from the prior art include that:

(1) an RC oscillating circuit is employed for generating the pressure signal in response to the imposed pressure;
(2) the A/D converter used in Ref. 1 to Ref. 4 is unnecessary;
(3) the VCO circuit employed for generating the reference signal and the comparator used for obtaining the compared result in Ref. 5 are also unnecessary.

Thereby, not only is the circuitry simplified but also the above-mentioned disadvantages are overcome.

SUMMARY OF THE INVENTION

The present invention is related to an electronic pressure gauge which eliminates not only the need of an A/D converter employed in Ref. 1 to Ref. 4 but also a VCO and a comparator used in Ref. 5, and improves the accuracy of the pressure reading. In addition, owing to the novel circuitry involved, simple, reliable circuitry and overall cost reduction are obtained.

Therefore, the first objective of the present invention is to provide a pressure gauge which simply generates a digital-like signal from an RC oscillating circuit including a pressure sensor as a resistor via a frequency modulating technique without utilizing any A/D converter and thus the errors resulting from analog-to-digital conversion can be avoided.

The second objective of the present invention is to provide a pressure gauge with less electronic unit cells.

The third objective of the present invention is to provide a pressure gauge with less manufacturing cost.

In accordance with another aspect of the present invention, a digital tire gauge adapted to be electrically connected to a power supply for measuring a pressure of a fluid in a tire comprising: a gauge housing mounting therein the power supply; a transducing oscillator mounted in the housing for transducing an imposed pressure of the fluid into a signal of a periodic sequence of cycles, and including: a pressure sensor having at least a resistor having a resistance thereof changing with the imposed pressure; a capacitor electrically connected to the pressure sensor for forming therewith an oscillating circuit; and a plurality of inverters electrically connected to the capacitor and the pressure sensor to provide a gain for the transducing oscillator; an isolating inverter electrically connected to the transducing oscillator, and functioning as a buffer for impedance matching of the transducing oscillator from been noised by the remainder of the circuitry; a processor mounted in the housing and electrically connected to the buffer for generating a numerical value in response to the signal from the buffer; a display mounted in the housing and electrically connected to the processor for displaying a digital reading in accordance with the numerical value; and a manually on/off switch mounted in the housing and electrically connected respectively at both ends thereof to the processor and the power supply.

In accordance with another aspect of the present invention, the transducing oscillator is an RC oscillating circuit with a time constant depends on the resistance of the pressure sensor and capacitance of the capacitor of the RC oscillating circuit.

In accordance with another aspect of the present invention, the pressure sensor electrically connected to an adjustable resistor for calibrating the time constant in fabrication by the manufacturer in order to meet the designed range of the time constant of the RC oscillating circuit.

In accordance with another aspect of the present invention, the transducing oscillator generates an oscillating signal of a periodic sequence of cycles, and the plurality of inverters provide a gain for the transducing oscillator to amplify the amplitude of the oscillating signal generated from the transducing oscillator to form the signal.

In accordance with another aspect of the present invention, the pressure sensor is a silicon pressure sensor which includes at least one piezoresistor and the silicon pressure sensor has a resistance thereof changing in response to the imposed pressure.

In accordance with another aspect of the present invention, the time constant of the RC oscillating circuit changes in response to the resistance change of the piezoresistor induced by the imposed pressure and the RC oscillating circuit has an oscillating frequency changing in response to the time constant change.

In accordance with another aspect of the present invention, the transducing oscillator includes active component, passive component, and the active component is one selected from a group consisting of a transistor, a FET, an operational amplifier, a logic IC inverter, a Schmitt gate, a NE555 timer IC, a NE556 timer IC, and an ICL8038 function generator.

In accordance with another aspect of the present invention, the processor is a micro-computer IC.

In accordance with another aspect of the present invention, the display is a liquid crystal display (LCD).

In accordance with another aspect of the present invention, the display is a light-emitting diode display (LED).

In accordance with another aspect of the present invention, the processor measures a duration of multiple cycles of the signal generated from the transducing oscillator.

In accordance with another aspect of the present invention, the processor measures the frequency or period of the signal generated from the transducing oscillator.

In accordance with another aspect of the present invention, the processor measures a period or multiple periods of the signal generated from the transducing oscillator.

In accordance with another aspect of the present invention, a stored program is employed for operating the processor wherein a linear factor is employed in the program to linearize the duration of multiple cycles of the signal into linearized-duration and a computational algorithm is employed in the program to convert the linearized-duration of multiple cycles of the signal into the numerical value corresponding to the imposed pressure and a gain factor is employed in the program to amplify the numerical value for the display.

In accordance with another aspect of the present invention, the numerical value is employed to display the digital reading corresponding to the imposed pressure.

The present invention may best be understood through the following description with reference to the accompanying drawings, in which:

DETAILED DESCRIPTION OF THE PREFERRED EMBODIMENT

The present invention discloses a pressure gauge for measuring the imposed pressure of a tire or other pressurized vessel and displays the pressure reading on a display.

Figure 5:
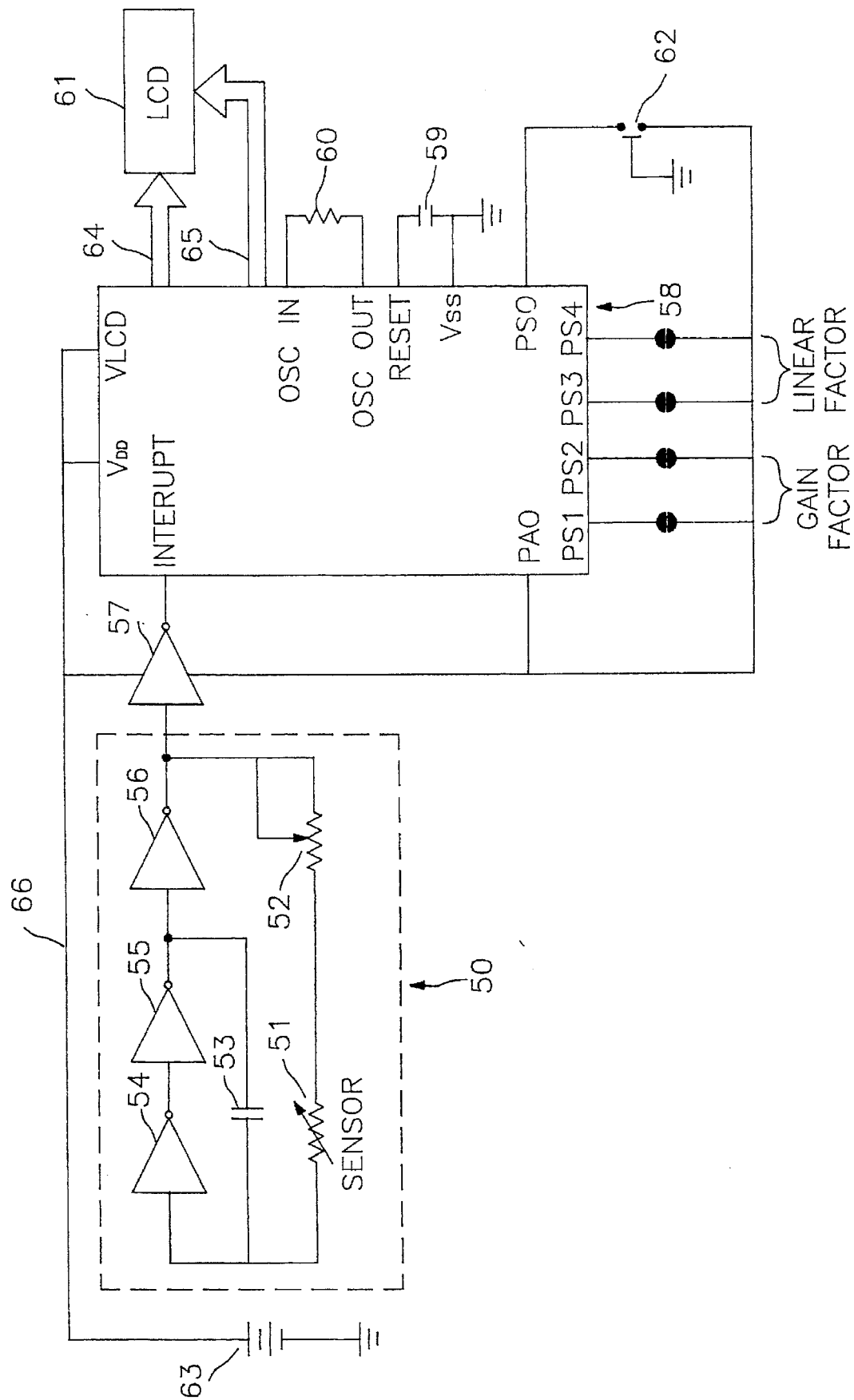
FIG. 5 is a schematic diagram showing the circuitry of the pressure gauge according to this invention.

FIG. 5 illustrates an electronic circuit diagram of the electronic circuitry used for the preferred embodiment of the present invention to engage a pressure measurement. This circuitry includes a circuit of the transducing oscillator 50, an inverter 57, an processor 58, a capacitor 59, an oscillator 60, a switch 62 and a battery 66 are connected to each other by conductor 66.

The transducing oscillator 50 is an oscillating circuit which is shown as the portion confined by a dash line in FIG. 5, and including a pressure sensor 51, a variable resistor 52, a capacitor 53 and plurality of inverters 54, 55 and 56. These elements are electrically connected to each other as depicted in FIG. 5, and functioning as an RC oscillator which generates an oscillating signal of a periodic sequence of cycles with a time constant of RC.

The distinguishing features of this invention from the prior art is that the pressure sensor 51 is placed into the oscillating circuit 50 and functioning as a variable resistor, and the time constant RC of the oscillating signal changing in accordance with the changing of the resistance of pressure sensor 51 in response to the imposed pressure.

Piezoresistor(s) as a pressure sensor utilized in this invention include(s) at least one piezoresistor (connected in series, if plural) and are mounted on a circular or a square diaphragm which is shown as the portion confined by a dash line in any of FIGS. 3A–3H. The imposed pressure is exerted in the direction perpendicular to the diaphragm. The number of the piezoresistors utilized on the diaphragm could be one or more, depending on what magnitude of resistance is required. When the diaphragm and piezoresistors thereon are depressed by an imposed pressure of a fluid, the resistances of the piezoresistors decrease if the piezoresistors are connected in a way shown in FIGS. 3A–3D, or increase if the piezoresistors are connected in a way shown in FIGS. 3E–3H. Preferably, the piezoresistors are connected in the former way as shown in FIGS. 3A–3D because the resistance as a function of the imposed pressure for a piezoresistor is nearly linear.

Figure 1:
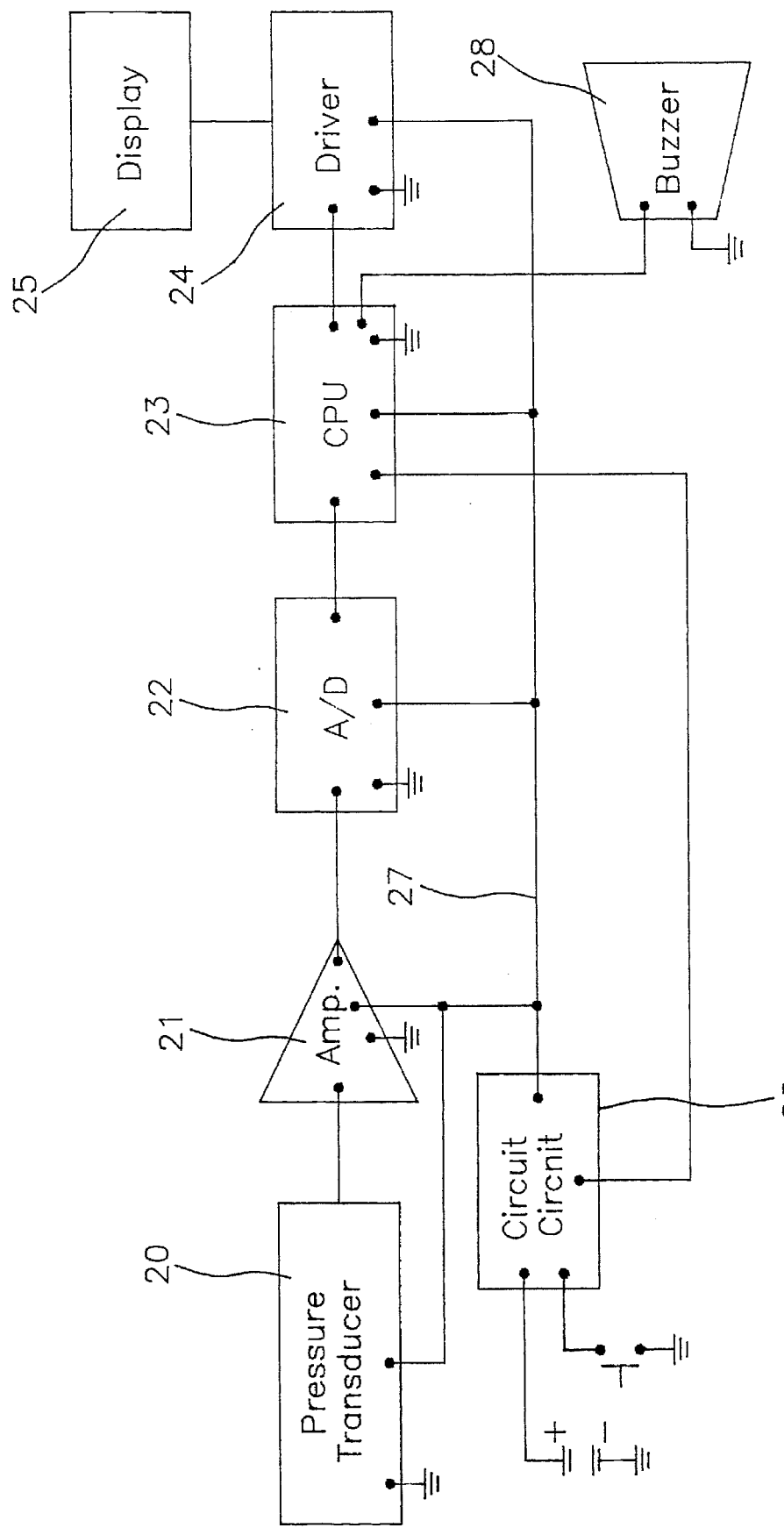
FIG. 1 is a circuit block diagram of the conventional digital pressure gauge.
Figure 2:
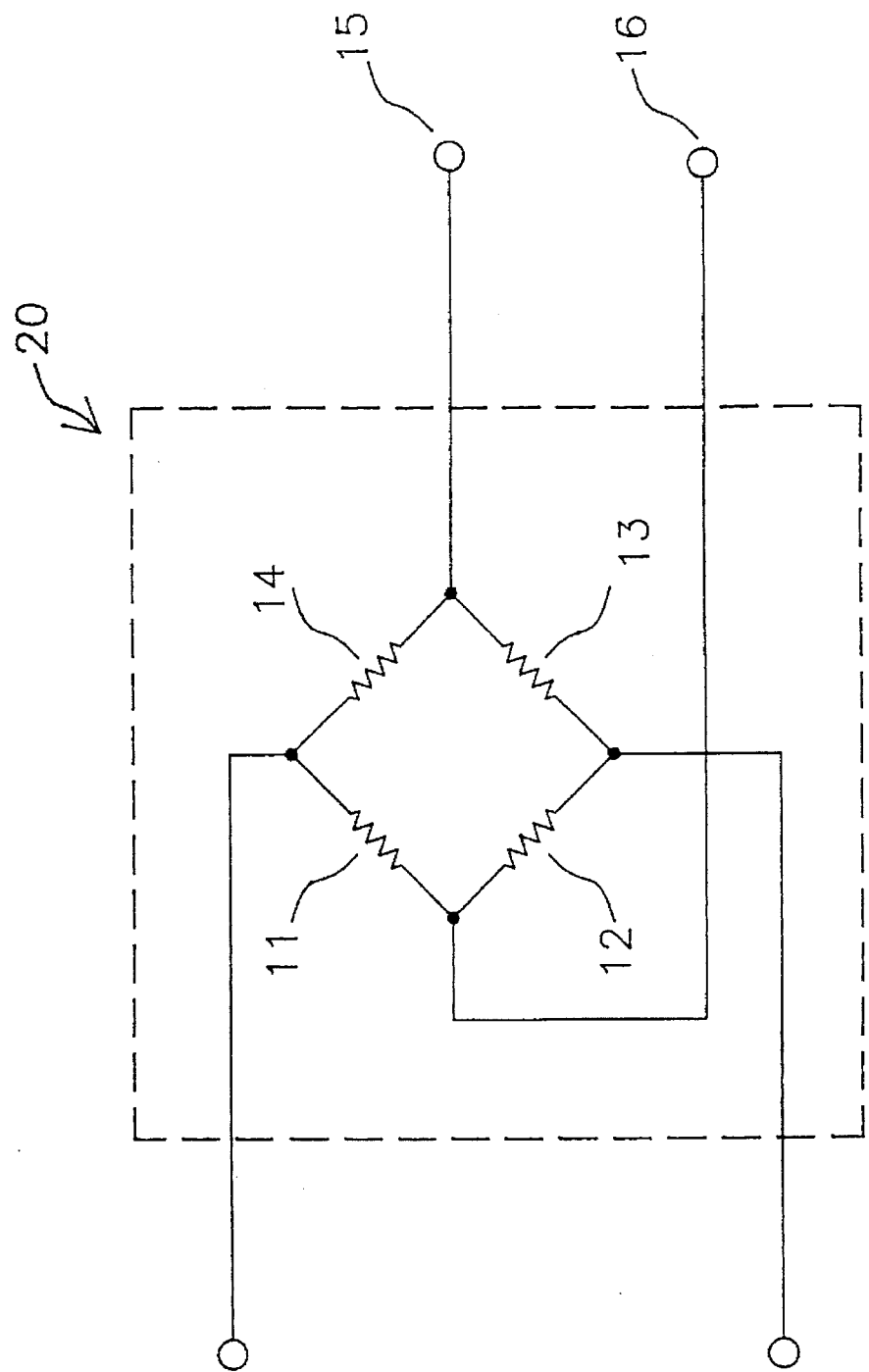
FIG. 2 is a schematic diagram of the transducer 20 shown in FIG. 1
Figure 3A:
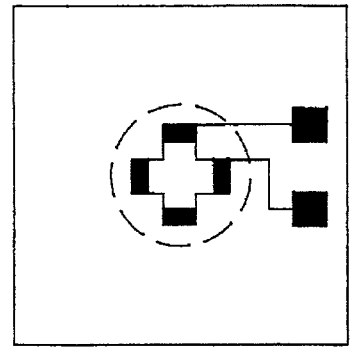
FIGS. 3A–3H are schematic diagrams showing the silicon pressure sensors of a preferred embodiment of the pressure sensor according to this invention.
Figure 3B:
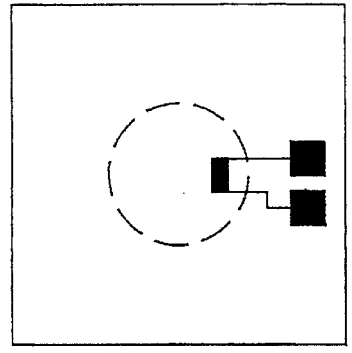
Figure 3E:
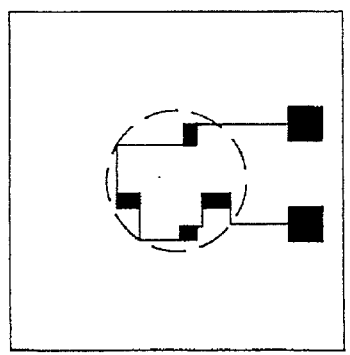
Figure 3F:
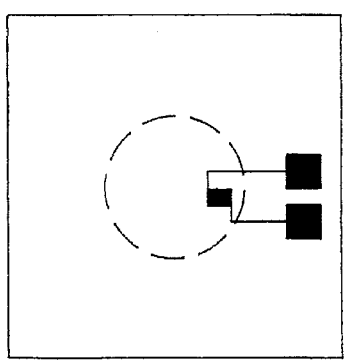
Figure 3C:
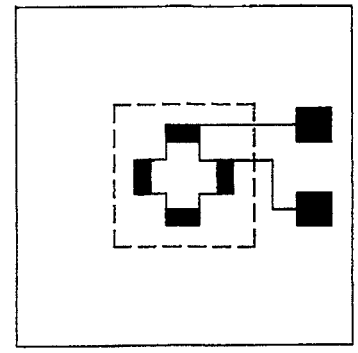
Figure 3D:
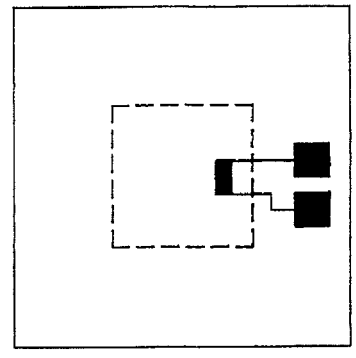
Figure 3G:
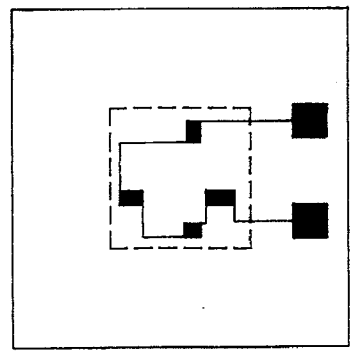
Figure 3H:
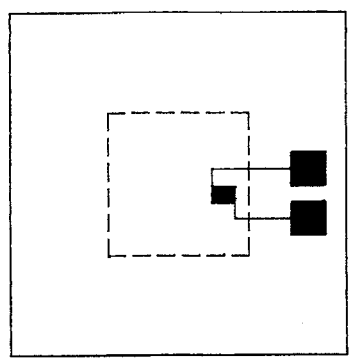
Figure 4:
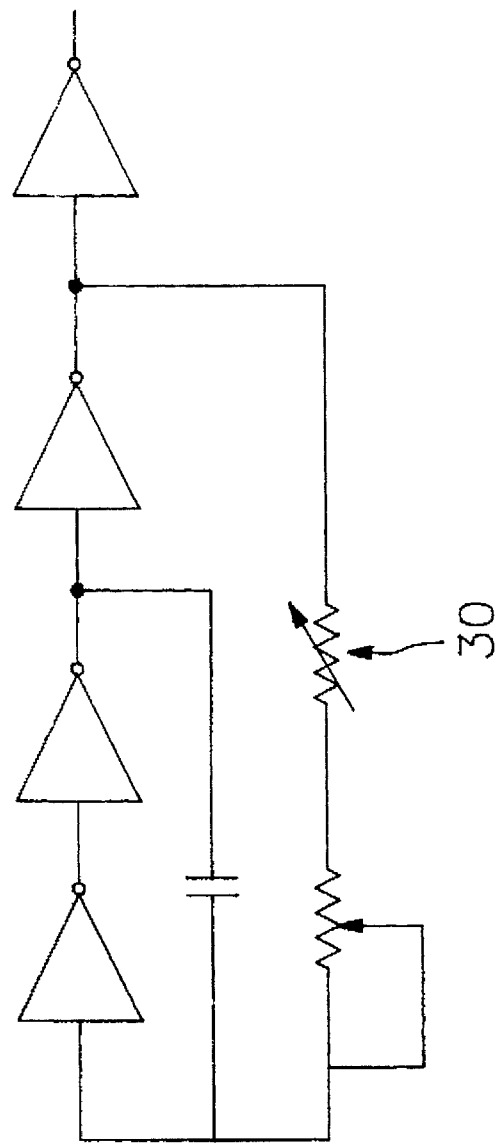
FIGS. 4, is a schematic diagrams showing the RC oscillating circuits of a preferred embodiment of the pressure sensor according to this invention.

If a silicon pressure sensor is utilized as a pressure sensor, as shown in FIG. 4, the silicon pressure sensor 30 is depressed by the imposed pressure and changes its resistance. The time constant RC of the oscillating circuit changes accordingly, so does the frequency output of the oscillating circuit. Therefore, digital-like signals of various frequencies are obtainable in accordance with various imposed pressures.

The oscillating circuit adopted in the present invention can be a Wien bridge oscillator, RC phase shift oscillator, an astable multivibrator, a sine wave generator with a modulated circuit, a digital signal synthesizer, and other possible alternative oscillators which can also provide a frequency output according to the change of the impedance of the pressure sensor.

Plurality of inverters 54, 55 and 56 employed in the transducing oscillator 50 as shown in FIG. 5 provides a gain for this oscillating circuit to amplify the amplitude of the oscillating signal having time constant RC, and the variable resistor 52 is used to calibrate the time constant RC by the manufacturer in fabrication in order to meet the designed range of the time constant of the transducing oscillator 50.

An isolating inverter 57 is electrically connected to the transducing oscillator 50 and, functioning as a buffer for impedance matching of the transducing oscillator 50 from been noised by the remainder of the circuitry as shown in FIG. 5.

The processor 58 controls the operation of the entire circuit as shown in FIG. 5 by processing the information according to the stored program and calculating the measured value of the imposed pressure. The processor 58 operating at a certain frequency which is established by an oscillator 60 connected to an OSC IN pin and OSC OUT pin, and this frequency is used to establish the flag period of bus cycle. Thereafter, this flag period is employed to measure the period T of the digital-like signals appearing at pin PA0 as indicated by T1 or T2 showing in FIGS. 6B or 6C, respectively.

In addition, the stored program including a gain factor and a linear factor is employed by the processor 58, and the stored program is used via pins PS1, PS2 and pins PS3, PS4 to amplify and linearize the digital-like signals received by pin PA0. The capacitor 59 is grounded for resetting the status of the processor 58 in certain situation.

The resulting value is obtained by utilizing the processor 58 to proceed the digital-like signal received by pin PA0. The LCD display 61 receives an electrical signal over the conductors 64 and 65 connecting the display to the LCD, and displays the pressure reading on the display 61.

Figure 6A:
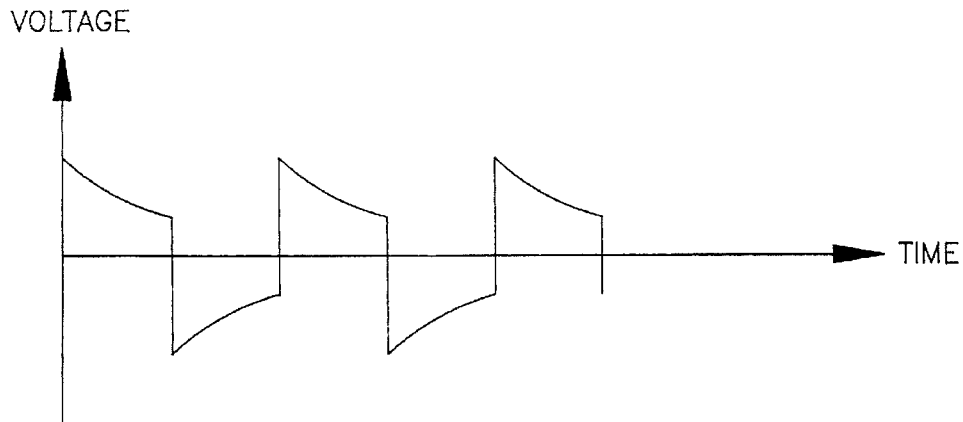
FIG. 6A shows an output signal of the pressure transducing oscillator according to this invention.
Figure 6B:
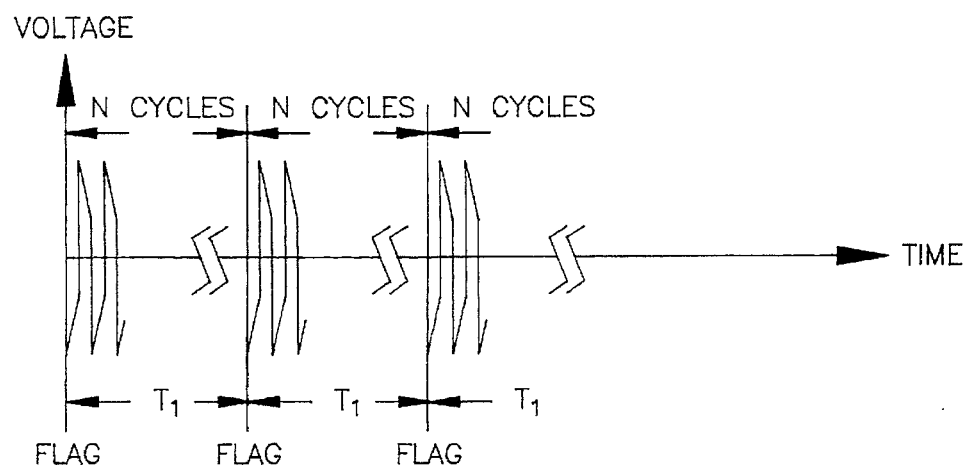
FIGS. 6B & 6C are timing diagrams of signals output from the pressure transducing oscillator under different imposed pressure values.
Figure 6C:
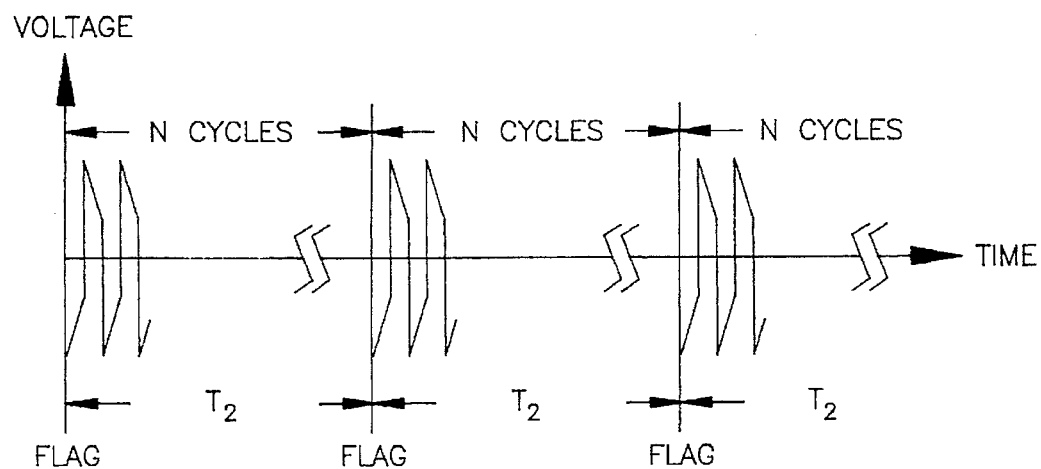

FIG. 6A–6C illustrates the output of the pressure transducing oscillator 50. As illustrated in FIG. 6A, the typical output of the pressure transducing oscillator 50 is an oscillating signal of a periodic sequence of cycles with a time constant RC. FIG. 6B depicted certain duration T1 of N (N is 256 in this preferred embodiment) periods of cycles generated from the pressure transducing oscillator 50 caused by certain imposed pressure P1, and in FIG. 6C also depicted certain duration T2 of N periods of cycles under the action of certain imposed pressure P2. Because the time constant RC are different due to the resistance changing of the pressure sensor induced by different imposed pressure, thereby the output signal oscillating frequency of the transducing oscillator 50 are different under pressure P1 and P2, respectively. Therefore, the duration T1 and T2 of N periods for different cycles for different signals are capable of being employed for representing the different magnitude of the imposed pressure.

Owing to the non-linear effects occurred during the converting process of from duration T to pressure reading P, a gain factor including magnification scale is employed by the stored program of the processor 58 to proceed a coarse adjustment, and a linearized factor comprises 8 linear segments is also employed by the stored program of the processor 58 to proceed a fine adjustment for obtaining the accurate results.

Figure 7A:
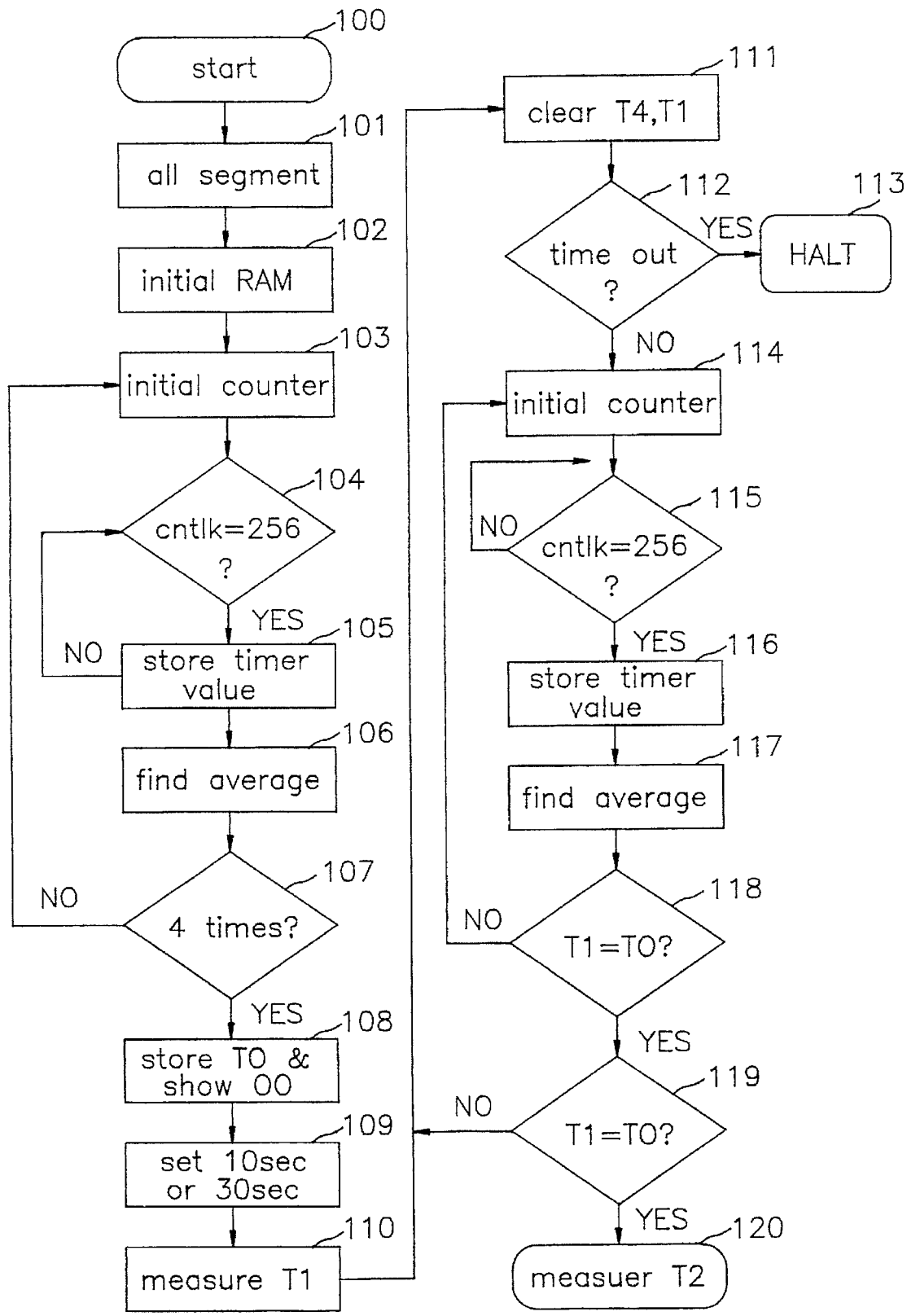
FIGS. 7A and 7B are flow charts showing the operation of the processor having therein a stored program.
Figure 7B:
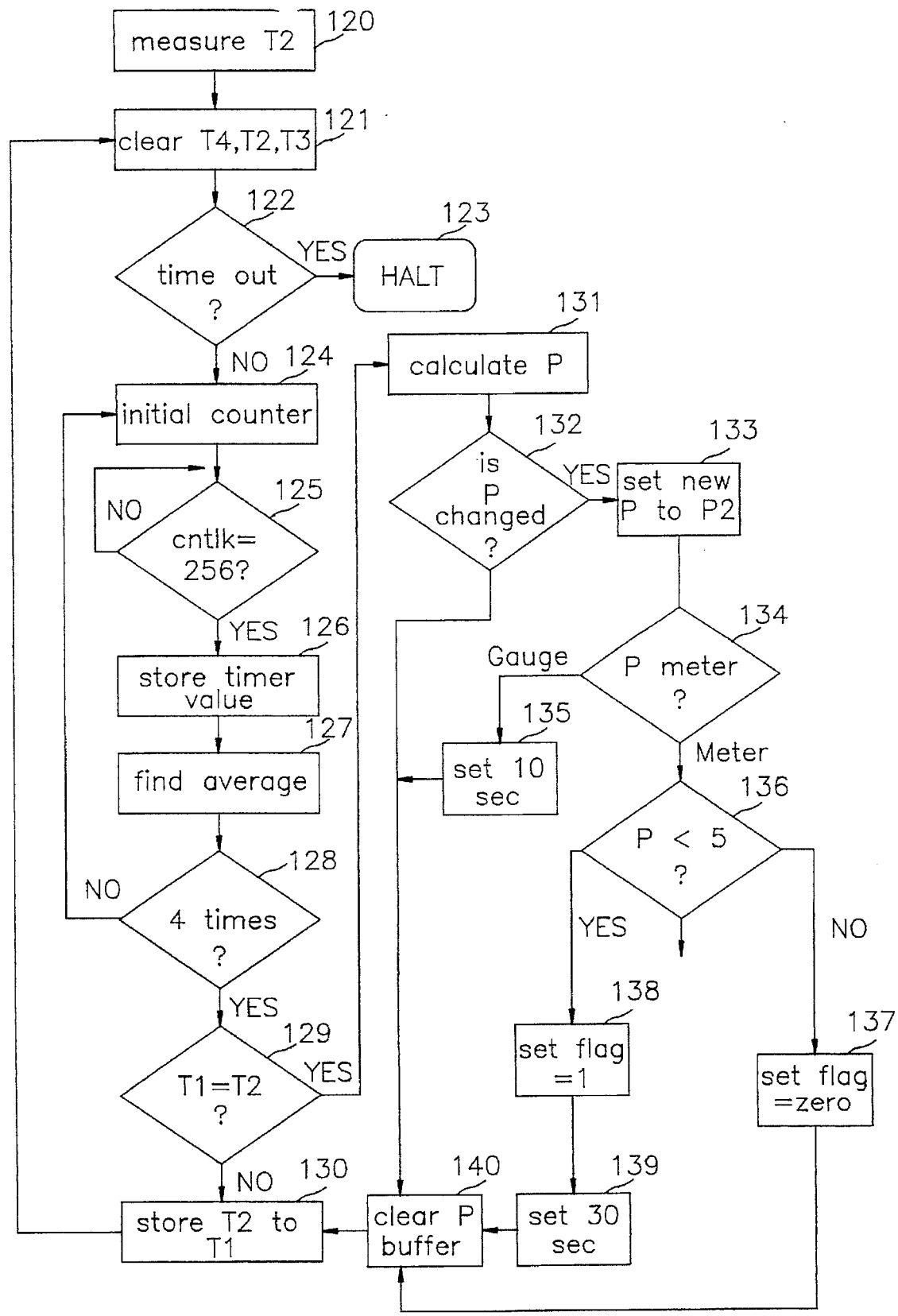

FIG. 7A & 7B are flow charts illustrating the major tasks performed by the processor 58 during the execution of the firmware programmed into the program memory means or ROM of the processor 58. Initially, at step 100 the switch 62 shown in FIG. 5 is set on, which enables the battery 63 to energize the entire circuit and starts the processor 58 to operation. At step 101, the processor 58 resets all segments of the entire circuit. At step 102 the random access memory of the processor is initialized, and at step 103 the counter is initialized by the processor 58 and sets the counter value to zero. At step 104, a duration of 256 periods of cycles of the digital-like signal appearing at pin PA0 of the processor 58 is measured, and if the counter value is not equal to 256 then the procedure is continued. Otherwise, if the counter value is 256, then step 105 is followed and the duration of the 256 periods of cycles of the digital-like signal in the timer is stored. At step 106 and 107 indicates that step 103 to step 105 are repeated for four times, and an averaged value is calculated for the duration T0. At step 108 the value of T0 is stored and '00' is shown on the display 61.

At step 109 a measuring time of 10 seconds or 30 seconds is set, a measurement for T1 is started at step 110, and at step 111 the memory for storing T4 and T1 is cleared. At step 112 if time out is true then the measurement is halt, otherwise step 114 to step 118 are progressed as the operation described for step 103 to step 107. At step 119, if T1 is not equals to T0 then step 111 to step 118 are repeated. At step 120, if it is true, a measurement for T2 is initialized. The memory for storing T4, T2, and T3 is cleared at step 121, and step 122 to step 128 are progressed as the operation described for step 112 to step 118. At step 129, if however T1 is not equals to T2 then T1 is substitute by T2, and step 121 to step 129 are repeated.

If it is true at step 129, the imposed pressure P is calculated by applying the stored program in the processor 58 at step 131. At step 132, if the imposed pressure P obtained by calculation is not changed then the buffer in the processor 58 for storing the P is cleared at step 140, and thereafter step 130, step 121 to step 129 are repeated. If the P is changed at step 132 then the P2 is replaced by the new P obtained by calculation at step 133. After step 134, there are two optional functions for the necessity of user. The first choice is a displaying time of 10 seconds at the display 61 for Gauge is set to display the numerical reading of P at step 135, and step 140, step 130, and step 121 to step 129 are followed. The other choice is step 136 for Meter. At step 136 if the P obtained by calculation is not less than 5, then the flag used for the pin INTERRUPT of processor 58 to trigger the counting action at pin PA0 is set equal to 0 at step 137 and the counting function is disable. Thereafter, step 140, step 130 and step 121 to step 129 are repeated. If, the result is true at step 136 then the flag is set equals to 1 and the counting function at pin PA0 is enabled, and a time for measurement of 30 seconds is set at step 139. Thereafter step 140, step 130 and step 121 to 129 are repeated.

As a consequence, according to the above description, the digital-like signal generated from the oscillating circuit 50 is further transmitted into a processor 58, i.e. a microcomputer IC or a CPU, from which a frequency output is measured by frequency, by period, or by the duration of multiple cycles. The frequency is converted via a programmed algorithm into a digital pressure reading shown on a display such as a LCD or a LED display 61, as shown in FIG. 5.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the broadest interpretation so as to encompass all such modifications and similar structures.

What is claimed is:

1. A digital tire gauge adapted to be electrically connected to a power supply for measuring a pressure of a fluid in a tire comprising:

a gauge housing mounting therein said power supply;

a transducing oscillator mounted in said housing for transducing an imposed pressure of said fluid into a signal of a periodic sequence of cycles, and including:
a pressure sensor having at least a resistor having a resistance thereof changing with said imposed pressure;
a capacitor electrically connected to said pressure sensor for forming therewith an oscillating circuit; and
a plurality of inverters electrically connected to said capacitor and said pressure sensor to provide a gain for said transducing oscillator;

an isolating inverter electrically connected to said transducing oscillator, and functioning as a buffer for the impedance matching of said transducing oscillator to prevent said transducing oscillator from been noised;

a processor mounted in said housing and electrically connected to said buffer for generating a numerical value in response to said signal generated from said buffer;

a display mounted in said housing and electrically connected to said processor for displaying a digital reading in accordance with said numerical value; and a manually on/off switch mounted in said housing and electrically connected respectively at both ends thereof to said processor and said power supply.

2. A digital tire gauge as claimed in claim 1 wherein said transducing oscillator is an RC oscillating circuit.

3. A digital tire gauge as claimed in claim 2 wherein has a time constant depends on said RC oscillating circuit resistance of said pressure sensor and capacitance of said capacitor.

4. A digital tire gauge as claimed in claim 2 wherein said pressure sensor electrically connected to a variable resistor for calibrating said time constant.

5. A digital tire gauge as claimed in claim 1 wherein said transducing oscillator generates an oscillating signal of a periodic sequence of cycles.

6. A digital tire gauge as claimed in claim 5 wherein said plurality of inverters provide a gain for said transducing oscillator to amplify an amplitude of said oscillating signal said transducing oscillator to form said signal.

7. A digital tire gauge as claimed in claim 1 wherein said pressure sensor is a silicon pressure sensor.

8. A digital tire gauge as claimed in claim 7 wherein said silicon pressure sensor includes at least one piezoresistor.

9. A digital tire gauge as claimed in claim 8 wherein said silicon pressure sensor has a resistance thereof changing in response to said imposed pressure.

10. A digital tire gauge as claimed in claim 9 wherein a time constant of said RC oscillating circuit changes in response to said resistance change of said piezoresistor induced by said imposed pressure.

11. A digital tire gauge as claimed in claim 10 wherein said RC oscillating circuit has an oscillating frequency changing in response to said time constant change.

12. A digital tire gauge as claimed in claim 1 wherein said transducing oscillator includes active component, and passive component.

13. A digital tire gauge as claimed in claim 12 wherein said active component is one selected from a group consisting of a transistor, a FET, an operational amplifier, a logic IC inverter, a Schmitt gate, a NE555 timer IC, a NE556 timer IC, and an ICL8038 function generator.

14. A digital tire gauge as claimed in claim 1 wherein said processor is a micro-computer IC.

15. A digital tire gauge as claimed in claim 1 wherein said display is a liquid crystal display (LCD).

16. A digital tire gauge as claimed in claim 1 wherein said display is a light-emitting diode display (LED).

17. A digital tire gauge as claimed in claim 1 wherein said processor measures a duration of multiple cycles of said signal generated by said transducing oscillator.

18. A digital tire gauge as claimed in claim 1 wherein said processor measures a frequency of said signal generated by said transducing oscillator.

19. A digital tire gauge as claimed in claim 1 wherein said processor measures a period of said signal generated by said transducing oscillator.

20. A digital tire gauge as claimed in claim 1 wherein a stored program is employed for operating said processor.

21. A digital tire gauge as claimed in claim 20 wherein a linear factor is employed in said program to linearize said duration of multiple cycles of said signal into linearized-duration.

22. A digital tire gauge as claimed in claim 20 wherein a computational algorithm is employed in said program to convert said linearized-duration of multiple cycles of said signal into said numerical value corresponding to said imposed pressure.

23. A digital tire gauge as claimed in claim 20 wherein a gain factor is employed in said program to amplify said numerical value for said display.

24. A digital tire gauge as claimed in claim 1 wherein said numerical value is employed to display said digital reading corresponding to said imposed pressure.

* * * * *